(12) United States Patent  
Ali et al.

(10) Patent No.: US 8,472,357 B2
(45) Date of Patent: Jun. 25, 2013

(54) SYSTEM, METHODS, AND APPARATUS FOR BIDIRECTIONAL RELAYING IN WIRELESS COMMUNICATIONS SYSTEMS

(75) Inventors: Yazdan Panah Ali, Austin, TX (US); Young Hoon Kwon, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 365 days.

(21) Appl. No.: 12/837,049

(22) Filed: Jul. 15, 2010

(65) Prior Publication Data

US 2011/0013552 A1 Jan. 20, 2011

Related U.S. Application Data

(60) Provisional application No. 61/226,200, filed on Jul. 16, 2009.

(51) Int. Cl.
*H04J 3/08* (2006.01)
*H04W 4/00* (2009.01)

(52) U.S. Cl.
USPC ............. 370/280; 370/315; 370/328; 455/7

(58) Field of Classification Search
None
See application file for complete search history.

(56) References Cited

U.S. PATENT DOCUMENTS 8,126,033 B2 * 2/2012 Jung et al. .................. 375/211
2008/0317017 A1 12/2008 Wiemann et al.
2009/0067533 A1 * 3/2009 Yuan et al. .................. 375/267
2009/0268662 A1 * 10/2009 Larsson et al. .............. 370/328
2010/0124186 A1 * 5/2010 Josiam et al. ............... 370/315

FOREIGN PATENT DOCUMENTS

| CN | 101069378 A | 11/2007 |
| CN | 101128997 A | 2/2008 |
| WO | WO 2004/107693 A1 | 12/2004 |

OTHER PUBLICATIONS

Ahlswede, R., et al., "Network Information Flow," IEEE Transactions on Information Theory, vol. 46, No. 4, Jul. 2000, pp. 1204-1216.
Alcatel-Lucent Shanghai Bell, "Applications of network coding in LTE-A," R1-090061, 3GPP TSG-RAN WG RAN 1#55bis, Jan. 12-16, 2009, 8 pages, Ljubljana, Slovenia.
Alcatel Shanghai Bell, "Joint analog network coding and Relay," R1-090065, 3GPP TSG-RAN WG RAN1#55bis, Jan. 12-16, 2009, 7 pages, Ljubljana, Slovenia.
LG Electronics, "UL subframe stealing for in-brand relaying in TDD mode," R1-090665, 3GPP TSG RAN WG1 Meeting #56, Feb. 9-13, 2009, pp. 1-6, Athens Greece.
3G Americas, 3GPP LTE for TDD Spectrum in the Americas, Nov. 2009, pp. 1-22.
International Search Report with Written Opinion of the International Searching Authority and Translation received in Patent Cooperation Treaty Application No. PCT/CN2010/075202, mailed Oct. 28, 2010, 12 pgs.

* cited by examiner

*Primary Examiner* — Marcus R Smith
(74) *Attorney, Agent, or Firm* — Slater & Matsil, L.L.P.

(57) ABSTRACT

In one embodiment, a method of wireless communication includes transmitting a first data packet from a user end during a first subframe of a radio frame. A second data packet is transmitted from a base station during a second subframe of the radio frame. A single data packet is received from a relay node in a third subframe of the radio frame. The single data packet includes the first and the second data packets.

27 Claims, 9 Drawing Sheets

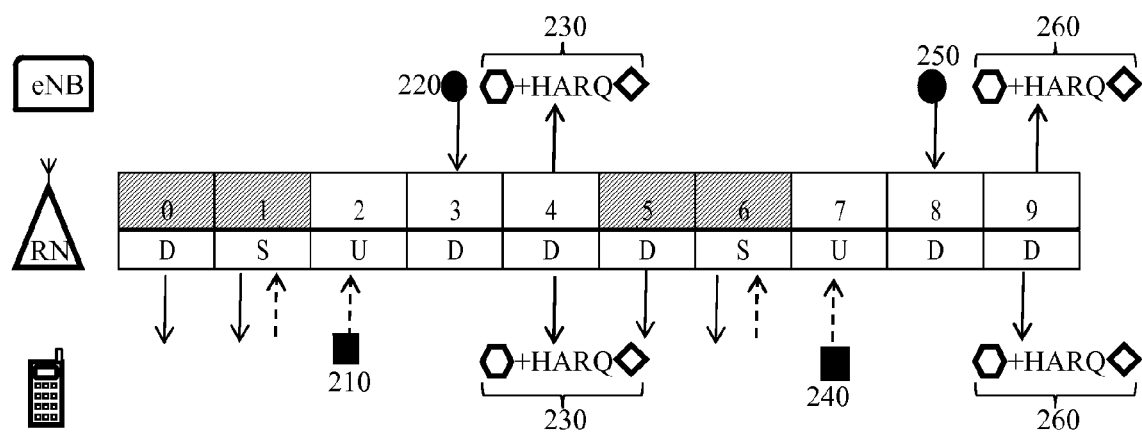
*Fig. 3a*
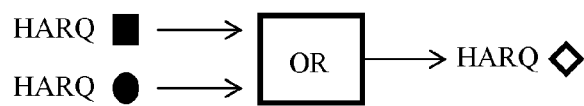
*Fig. 3d*
*Fig. 3b*
*Fig. 3c*

SYSTEM, METHODS, AND APPARATUS FOR BIDIRECTIONAL RELAYING IN WIRELESS COMMUNICATIONS SYSTEMS

This application claims the benefit of U.S. Provisional Application No. 61/226,200, filed on Jul. 16, 2009, entitled "Bidirectional Relaying in Wireless Communications Systems," which application is hereby incorporated herein by reference.

TECHNICAL FIELD

The present invention relates generally to wireless communications systems, and more particularly to a system, apparatus, and methods for bidirectional relaying in wireless communications systems.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

Some systems, such as LTE, strive to serve densely populated areas with very high data rates. One way in which an LTE network can provide dense coverage and high data capacity in a cost effective manner is to utilize Relay nodes (RNs), which function as base stations to user devices, but do not have a backhaul connections as base stations do. Instead, the RN communicates with an LTE base station (eNB) via a standard LTE radio link. BS is also be commonly referred to as evolved nodeB (eNB), base transceiver station, controller, access point (AP), access network (AN), and so forth, while a user device or user equipment (UE) may also be commonly referred to as mobile station (MS), access terminal (AT), subscribers, subscriber stations, terminals, mobile stations, and so on.

The use of RN, while increasing data rate, may decrease the throughput (data rate per time slot) because of the sharing of the channel resources between the RN, the eNB, and the user devices. One of the challenges in incorporating relay nodes therefore involves the maximization of spectral efficiency.

SUMMARY OF THE INVENTION

In accordance with an embodiment, a method of wireless communication comprises transmitting a first data packet from a user end during a first subframe of a radio frame. A second data packet is transmitted from a base station during a second subframe of the radio frame. A single data packet is received from a relay node in a third subframe of the radio frame. The single data packet comprises the first and the second data packets.

In an alternative embodiment, a method of wireless communication comprises receiving a first data packet at a relay node. The first data packet is transmitted from a user end during a first subframe of a radio frame. A second data packet is received at the relay node. The second data packet is transmitted from a base station during a second subframe of the radio frame. A single data packet is transmitted from the relay node in a third subframe of the radio frame. The single data packet comprises the first and the second data packets.

In yet another embodiment, a method of wireless communication comprises transmitting a first data packet from a base station during a second subframe of the radio frame. A first subframe of the radio frame is allocated to a user device for transmission. Receiving a single data packet in a third subframe of the radio frame at the base station. The single data packet comprises the first data packet and a second data packet from the user device. The method further includes extracting the second data packet, the second data packet comprising a HARQ indicator. A next data packet is transmitted based on the HARQ indicator.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 3, which includes FIGS. 3a-3d, illustrates a two-way relaying (bidirectional relaying) within a LTE TDD configuration in accordance with an embodiment of the invention;

FIG. 4, which includes FIGS. 4a and 4b, illustrates a re-transmission protocol for analog network coding in accordance with an embodiment of the invention, wherein FIG. 4a illustrates operations at a RN, and wherein FIG. 4b illustrates operation at a UE or a eNB;

FIG. 5, which includes FIGS. 5a and 5b, illustrates a re-transmission protocol for digital network coding in accordance with an embodiment of the invention, wherein FIG. 5a illustrates operations at a relay node, and wherein FIG. 5b illustrates operations at a UE or an eNB;

Figure 6:
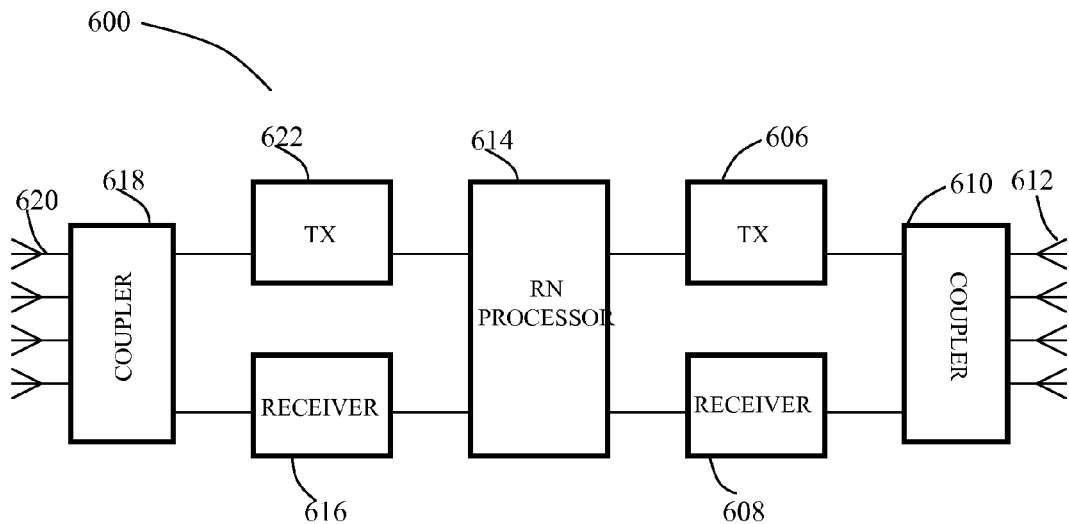
Figure 7:
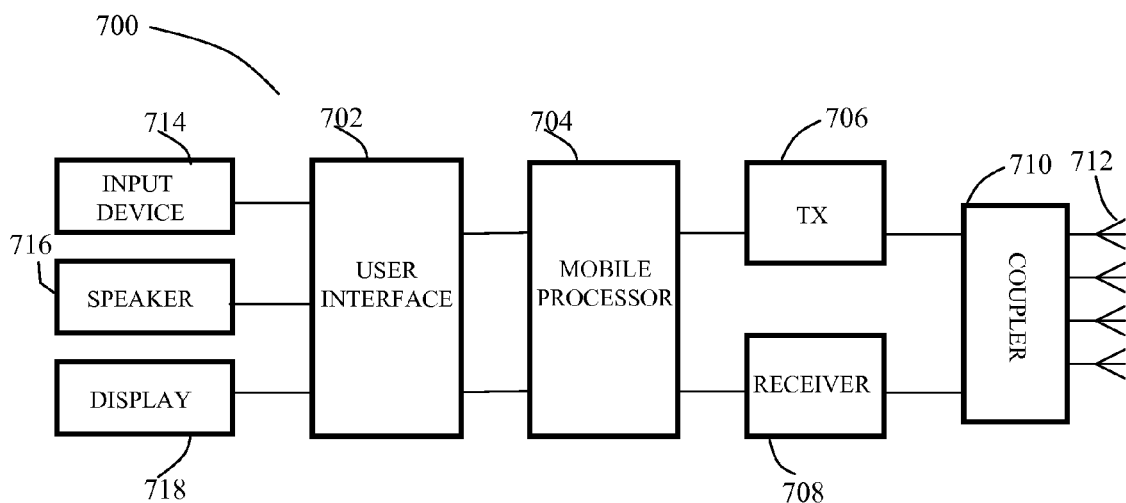

A block diagram of an embodiment relay node is illustrated in FIG. 6;

A block diagram of embodiment user device is illustrated in FIG. 7; and

Figure 8:
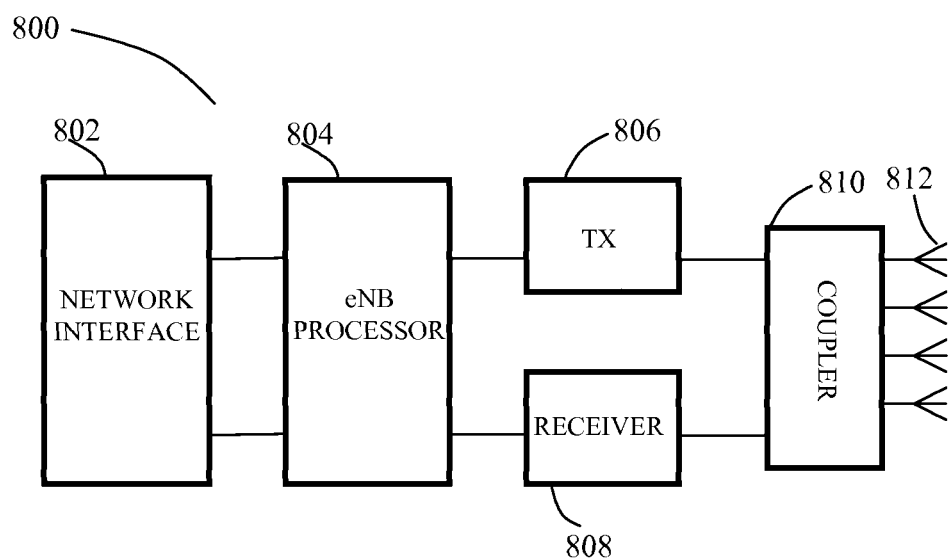

A block diagram of an embodiment eNB is illustrated in FIG. 8.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments of the invention include the utilization of network coding with time division duplex (TDD) configurations of Long Term Evolution (LTE). LTE support both time division duplex (TDD) and frequency division duplex (FDD).

In LTE, the transmitted signal is organized into subframes of 1 millisecond (ms) duration so that 10 subframes constitute a radio frame. Each subframe normally consists of 14 OFDM symbols (12 OFDM symbols in case of the so-called "Extended Cyclic Prefix"). Dynamic scheduling of the uplink and downlink resources are used, where the scheduling decisions are communicated from the base station to the terminals as part of the control signaling in the first few OFDM symbols of each downlink subframe.

TDD is a method of channel resource allocation in the downlink and uplink of a wireless transmission scheme. TDD is a well-known technique for dividing orthogonal channel resources between uplink and downlink transmission, and is fully adopted in LTE and Long Term Evolution Advanced (LTE-A).

Although the frame structure is, in most respects, the same for LTE FDD and LTE TDD, there are some differences between the two, most notably the use of special subframes in TDD. Another difference is that other subframes are allocated either for uplink transmission or for downlink transmission.

In LTE FDD operation, there are two carrier frequencies, one for uplink transmission (fUL) and one for downlink transmission (fDL). During each frame, there are consequently 10 uplink subframes and 10 downlink subframes. Therefore, in FDD operation, both uplink and downlink transmissions can occur simultaneously within a cell.

In LTE TDD operation, there is only one single carrier frequency. Therefore, uplink and downlink transmissions in the cell are always separated in time. As the same carrier frequency is used for uplink and downlink transmission, both the base station and the mobile terminals must switch from transmission to reception and vice versa. Because a subframe is either an uplink subframe or a downlink subframe, the number of subframes per radio frame in each direction is less than 10.

Therefore, each subframe (1 ms long) within a TDD radio frame (10 ms long) is designated as uplink/downlink/shared where uplink and downlink occur over distinct frequency bands. The shared subframes may also be used for downlink or uplink.

To meet different requirements on uplink/downlink traffic asymmetries, LTE supports seven different uplink/downlink configurations. Embodiments of the invention are described using a particular frame configuration of the TDD (configuration #2) only as an example. However, in various embodiments, the present invention applies to all the seven uplink/downlink configurations supported in LTE. Further, embodiments of the invention also apply to other frame configurations available in TDD including future TDD configurations supported of LTE.

Embodiments of the invention use network coding. Network coding is a new paradigm for wireless communications using relay nodes. In network coding, mixing of data at intermediate network nodes is allowed and increased to maximize information flow through the network. A receiver receiving these mixed data packets deduces the messages that were originally intended to it. In contrast, traditional methods avoid collisions of data streams as much as possible. The sharing of data streams increases the efficiency of data flow in network coding. Embodiments of the invention apply network coding to maximize information flow between user equipment (UE) and base stations (BSs).

In conventional relaying strategies, the relay node only processes uplink or downlink data packets at any given time. Thus, a full transmission cycle (defined as one complete uplink-downlink transmission) will require four channel resources, e.g., time slots. A first time slot is used when a UE transmits to a relay node, a second time slot is used when the relay node transmits to the UE, a third time slot is used when a base station transmits to the relay node, and a fourth time slot is used when the relay node transmits to the base station. In embodiments of the invention using network coding, the relay node simultaneously processes both the uplink and downlink signals.

In contrast, embodiments of the invention use only three channel uses potentially increasing the spectral efficiency. This is achieved by using a single transmission from the relay node to the UE and the base station.

Embodiments of the invention describe a feasible network coding solution for time-division duplexing (TDD) based wireless transmission systems. In various embodiments, a hybrid automatic repeat-request (HARD) structure based on simple binary operations complements our invention. As an example, a LTE-TDD configuration (configuration #2) is described in detail. However, embodiments of the invention also include extending this framework for other TDD configurations.

Figure 1:
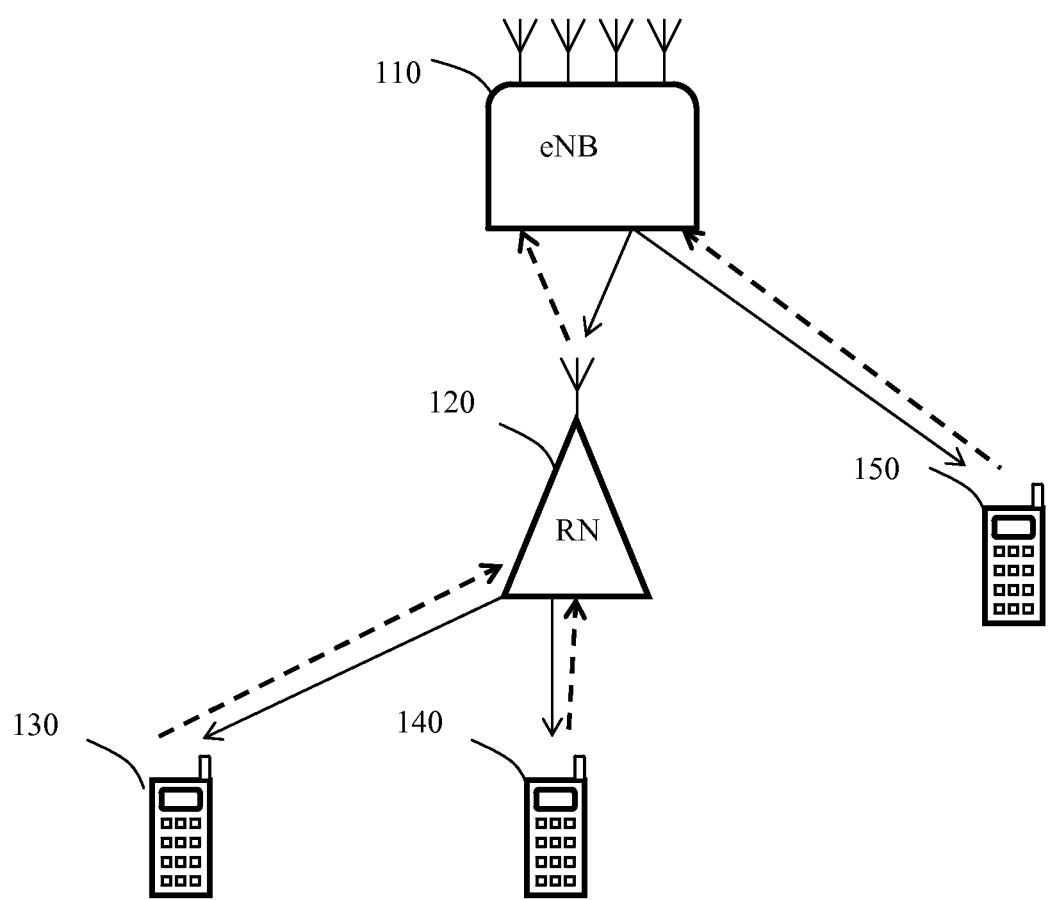
FIG. 1 illustrates a system model of the wireless communication system implementing embodiments of the invention.

FIG. 1 illustrates a system model of the wireless communication system implementing embodiments of the invention.

Referring to FIG. 1, an eNB 110 communicates with a relay node 120, which then communicates with a plurality of UEs, such as UE 130 and UE 140. The eNB may also communicate directly with some UEs, such as UE 150.

Uplink (UL) transmissions (dashed lines in FIG. 1) and downlink (DL) transmissions (solid lines in FIG. 1) are separated into two distinct frequency bands and a full transmission cycle is defined as the transmission of one data packet from the eNB 110 to the UE 130 (or UE 140), in the DL frequency band, and one data packet from the UE 130 (or UE 140) to the eNB 110 in the UL band.

Figure 2:
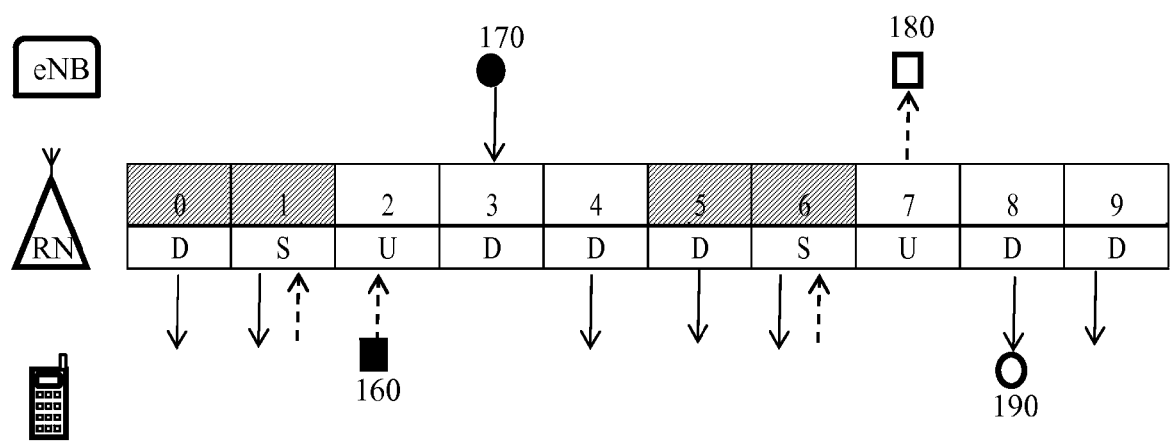
FIG. 2 illustrates a typical single 10 ms LTE radio frame for TDD configuration #2.

FIG. 2 illustrates a typical single 10 ms LTE radio frame for TDD configuration #2. Referring to FIG. 2, the radio frame is subdivided into ten 1 ms subframes: 0, 1, . . . , 9.

Transmissions from a eNB, such as eNB 110 in FIG. 1, to a relay node (RN), such as RN 120 in FIG. 1, are only possible via multi-cell multicast-broadcast single frequency network MBSFN subframe configurations (subframes 2-4, 7-9). Subframes 0, 1, 5, and 6 (highlighted in FIG. 2) are reserved for synchronization (or paging) purposes (non-MBSFN), and hence cannot be used for DL data transmission on the relay link, which is also known as the backhaul link. These non-MBSFN subframes may be used to service a separate UE connected to the eNB, sometimes called a macro-UE (see e.g., UE 150 in FIG. 1). Subframes 2 and 7 are designated for UL transmission in the UE-to-RN (also known as the access link) or RN-to-eNB links.

Therefore, as illustrated in FIG. 2, configuration #2 includes 4 DL subframes but only 2 UL subframes. While the additional DL transmission may be accomplished if subframe 4 is allocated to the backhaul link and the subframe 9 is utilized, a corresponding UL transmission cannot be scheduled in the same radio frame (due to the limited availability of UL subframes). Hence, configuration #2 can complete only one transmission cycle in a single radio frame. This presents a 2-to-1-load asymmetry in favor of the DL, i.e., ½ transmission cycles are possible. The transmission cycle is completed by transmitting a UL data packet 160 from the UE to the RN in subframe 2, and a DL data packet 170 from the eNB to the RN in subframe 3. The corresponding data packet 180 from the UE is transmitted from the RN to the eNB at subframe 7. The data packet 190 from the eNB may be transmitted to the UE at subframe 8 or subframe 9.

Embodiments of the invention overcome these and other limitations. Using two-way relaying, a single radio frame may be able to support 2 complete transmission cycles with a one-to-one UL-DL load symmetry, thus having the potential to increase spectral efficiency by 50%.

FIG. 3, which includes FIGS. 3a-3d, illustrates a two-way relaying (bidirectional relaying) within the LTE TDD configuration #2 in accordance with an embodiment of the invention. There are two aspects to this proposal, which for clarity is described separately. The transmission protocol is first described followed by a re-transmission protocol.

The transmission protocol is first described in accordance with an embodiment of the invention. At subframes 2 and 3, the UE and eNB transmit modulated UL and DL data packets 210 and 220 to the RN, respectively. The RN broadcasts a single modulated data packet 260 corresponding to these data packets to both the eNB and UE in subframe 9.

Similarly, subframe 4 corresponds to subframes 7 and 8 of the prior radio frame. Therefore, in subframe 4, the RN broadcasts a single modulated data packet 260 (corresponding to data packets 240 and 250 of previous frame) to both the eNB and UE. In subframes 7 and 8, the UE and eNB transmit modulated UL and DL data packets 240 and 250 to the RN.

As discussed above, downlink subframes are allocated for transmission from the eNB to the RN or the RN to the UE. In uplink-downlink subframe rescheduling, these subframes can be configured for transmission from the RN to the eNB.

The RN has two options in constructing this signal, which is dictated by its operational capabilities. In the first option, an analog network coding is used. In analog network coding (amplify-and-forward mode), the RN constructs a superposition (addition) of the analogue version of the received signals. Alternatively, in a second option, digital network coding is used.

In another option, digital network coding is used. In digital network coding (decode-and-forward mode), the RN separately demodulates, decodes and XORs the data packets from eNB and UE to construct its transmitted signal. In digital network coding, the relay first receives the signals from the eNB (downlink) and then from the UE (uplink) and decodes each packet stream separately. It then combines both packets into a single packet comprising an XOR version of these decoded packets. This packet is then modulated and transmitted from the relay node to both the user end (UE) and the base station (eNB). The UE and eNB perform similar XOR operations to remove the self-interference terms and subsequently decode their intended packets.

Regardless of the chosen method, the resulting signal is broadcasted to both the eNB and the UE in a single subframe, such as the modulated data packet 230 in subframe 4 or the modulated data packet 230 in subframe 9. From this single data packet, both the eNB and UE may extract their intended UL and DL information by removing the self-interference as illustrated in FIG. 3b. In digital network coding, the terminals (UE and eNB) demodulate, decode and perform an XOR operation on the result with their respective transmitted signals. In analog network coding, the terminals first subtract the analogue version of their own transmitted signal and then proceed to demodulate and decode the data stream.

The re-transmission protocols will be described in accordance with embodiments of the invention. One way of error correction commonly used in wireless technology is hybrid automatic repeat request (HARQ). Hybrid ARQ is a re-transmission protocol that insures quality of service over digital communication links. HARQ is an error control method in which error detection information such as forward error correction may be added along with the data being transmitted. As will be described in detail for different types of network coding, each of the data packets in FIG. 3a, such as the UL data packets 210 and 240 and the DL data packets 220 and 250, comprise a HARQ indicator.

Indicator (re-transmission) signals must be designed for each type of network coding (digital and analog) independently. The indicator signals must be also be designed for transmissions emanating from the communicating terminals, i.e., both eNB and UE, and from the RN.

Because of the differences in retransmission protocol for analog and digital network coding, they will be described separately. The analog network coding is first described followed by the digital network coding.

Figure 4A:
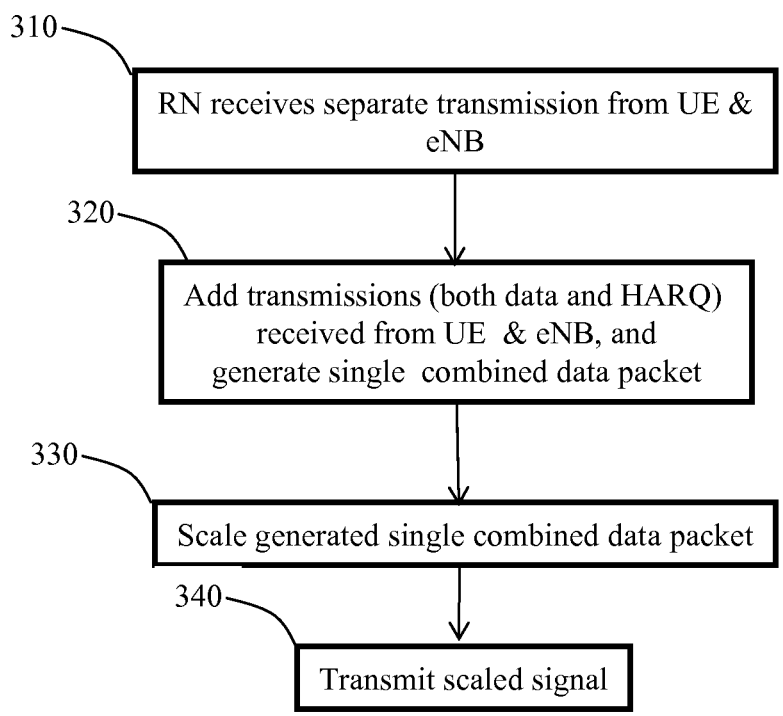
Figure 4B:
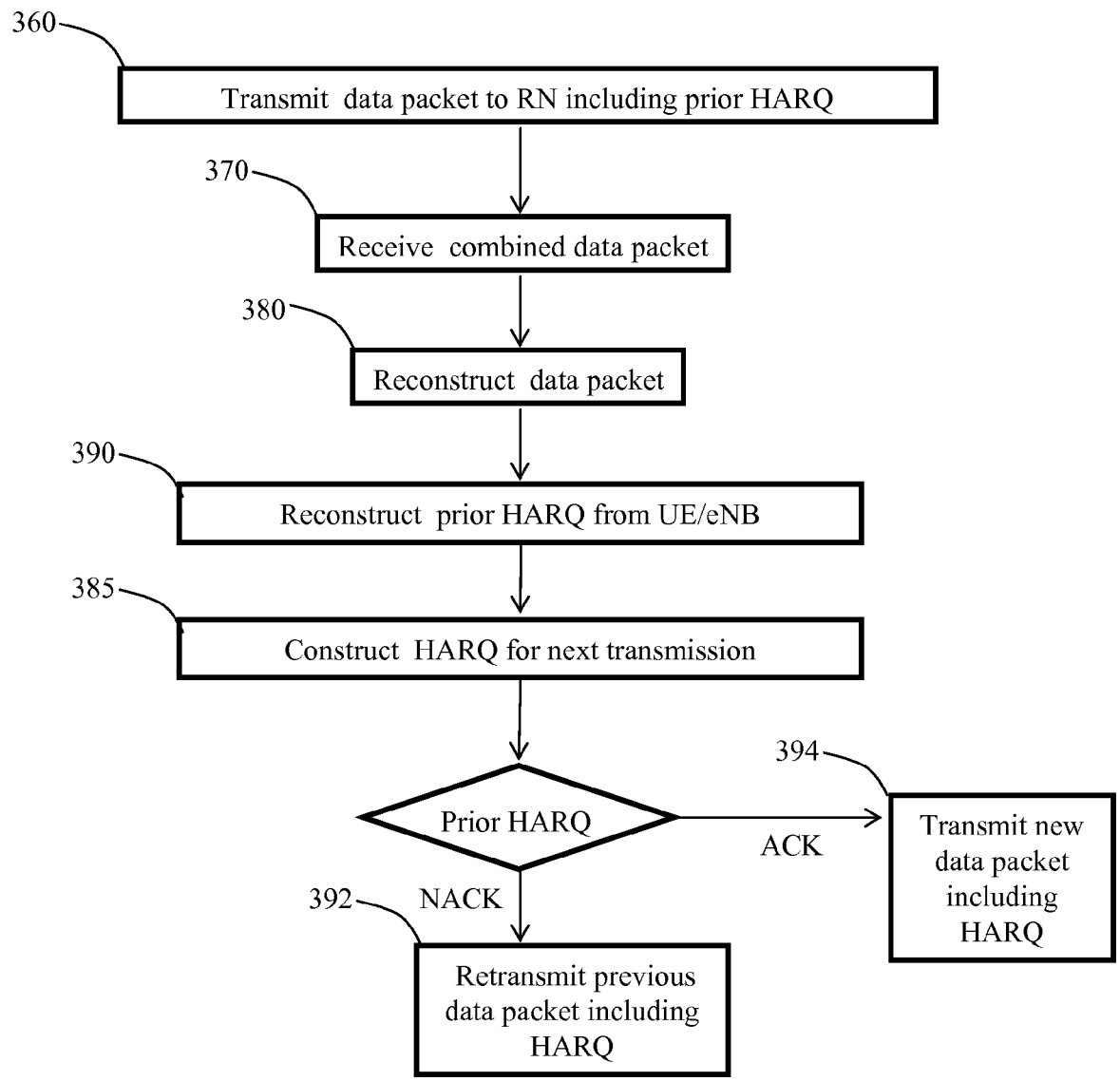

The re-transmission protocol for analog network coding is now described in accordance with an embodiment of the invention using FIG. 4, which includes FIGS. 4a and 4b. FIG. 4a illustrates operations at a RN, whereas FIG. 4b illustrates operation at a UE or a eNB. In the analog network coding, the RN does not construct a HARQ indicator signal because it does not decode the data packets obtained from subframes 2 and 3.

However, the transmission from the terminals (eNB and UE) requires a HARQ signal. Once the terminals have demodulated and decoded their intended data packets, each terminal constructs and transmits a HARQ signal indicating the success or failure of the decoding operation. In one case, the HARQ structure is similar to conventional HARQ structures. The HARQ signals from the UE and the eNB are forwarded along with the data packets via the RN as illustrated in FIG. 3c. The eNB and UE hence receive their corresponding ACK/NACK signals (scaled versions) and schedule possible re-transmissions.

The steps pertaining to the analog network coding approach (amplify-and-forward method) as illustrated in FIG. 3 is described as follows, in accordance with embodiments of the invention. At subframe 2, the RN receives a data packet (along with HARQ relating to decoding at 9) from the UE (box 310 in FIG. 4a and box 360 in FIG. 4b). At subframe 3, the RN receives a data packet (along with HARQ relating to decoding at 9) from the eNB (box 310 in FIG. 4a and box 360 in FIG. 4b). The RN adds these signals (both data and HARQ) and scales the result according to its power constraint (boxes 320 and 330 in FIG. 4a). At subframe 9, the RN transmits the combined data packets (box 340 in FIG. 4a).

The eNB and UE receive the transmitted combined data packet from the RN at subframe 9 (box 370 in FIG. 4b). The following is described using the eNB as an example, while the UE performs a similar operation. At subframe 9, the eNB uses knowledge regarding its own signal (both data and HARQ) to remove self-interference and then decodes the data packet from the UE (box 380 in FIG. 4*b*). From the reconstructed data packet, the eNB reconstructs the HARQ message from the UE (box 390 in FIG. 4*b*). If the data packet received at the eNB includes a NAWK from the UE, the eNB retransmits the previously transmitted data packet (box 392 in FIG. 4*b*). If on the other hand, the reconstructed data packet includes an ACK, the eNB prepares and transmits the next data packet (box 394 in FIG. 4*b*). The eNB constructs HARQ relating to the success/failure of the reconstruction of the data packet (box 385 in FIG. 4*b*), which is transmitted at subframes 2 and 3, respectively. This cycle repeats from the beginning (and similarly for subframes 7, 8 and 4).

The re-transmission protocol for digital network coding (decode-and-forward method) is now described in accordance with an embodiment of the invention using FIG. 3 and FIG. 5.

Figure 5A:
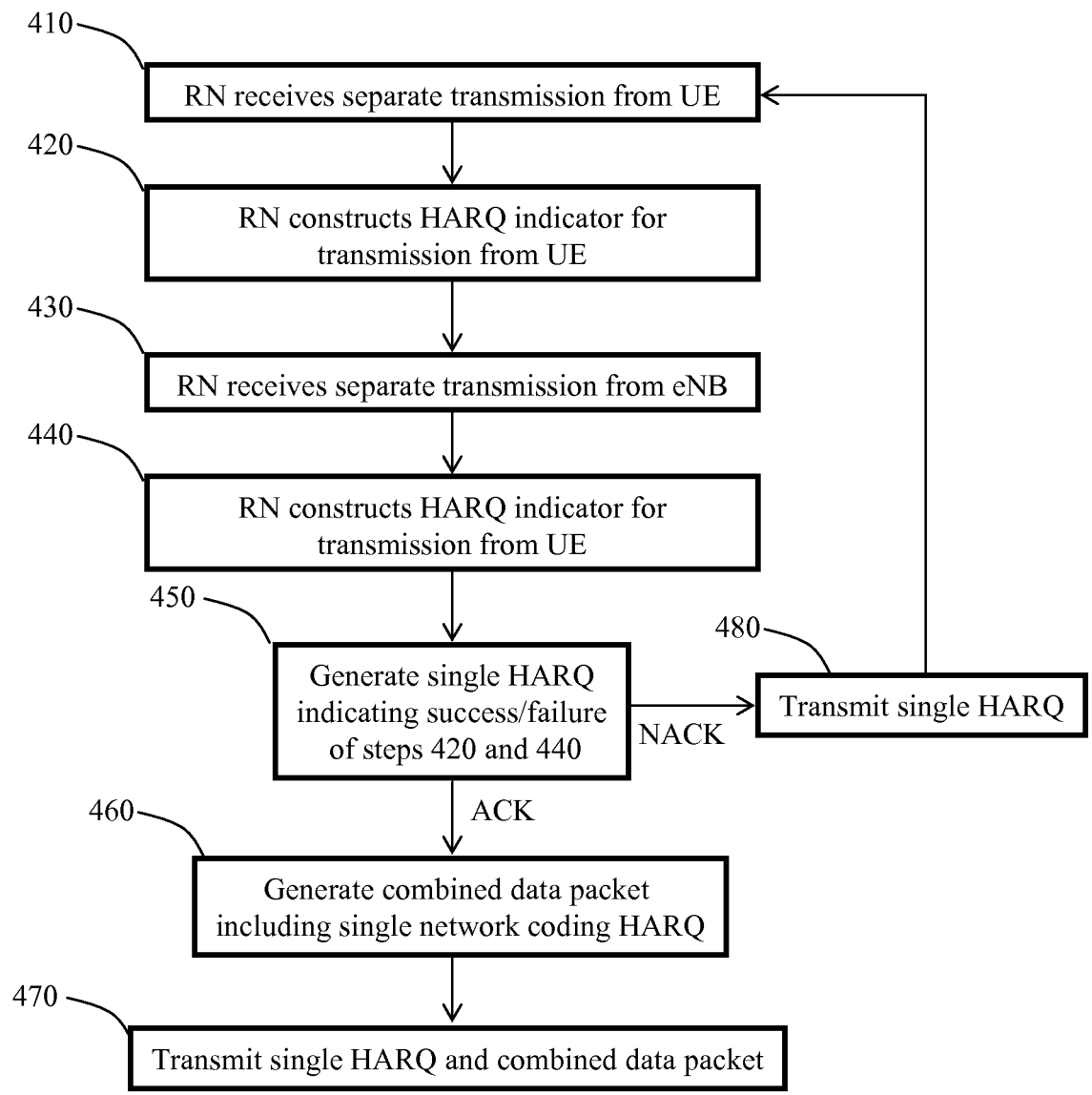
Figure 5B:
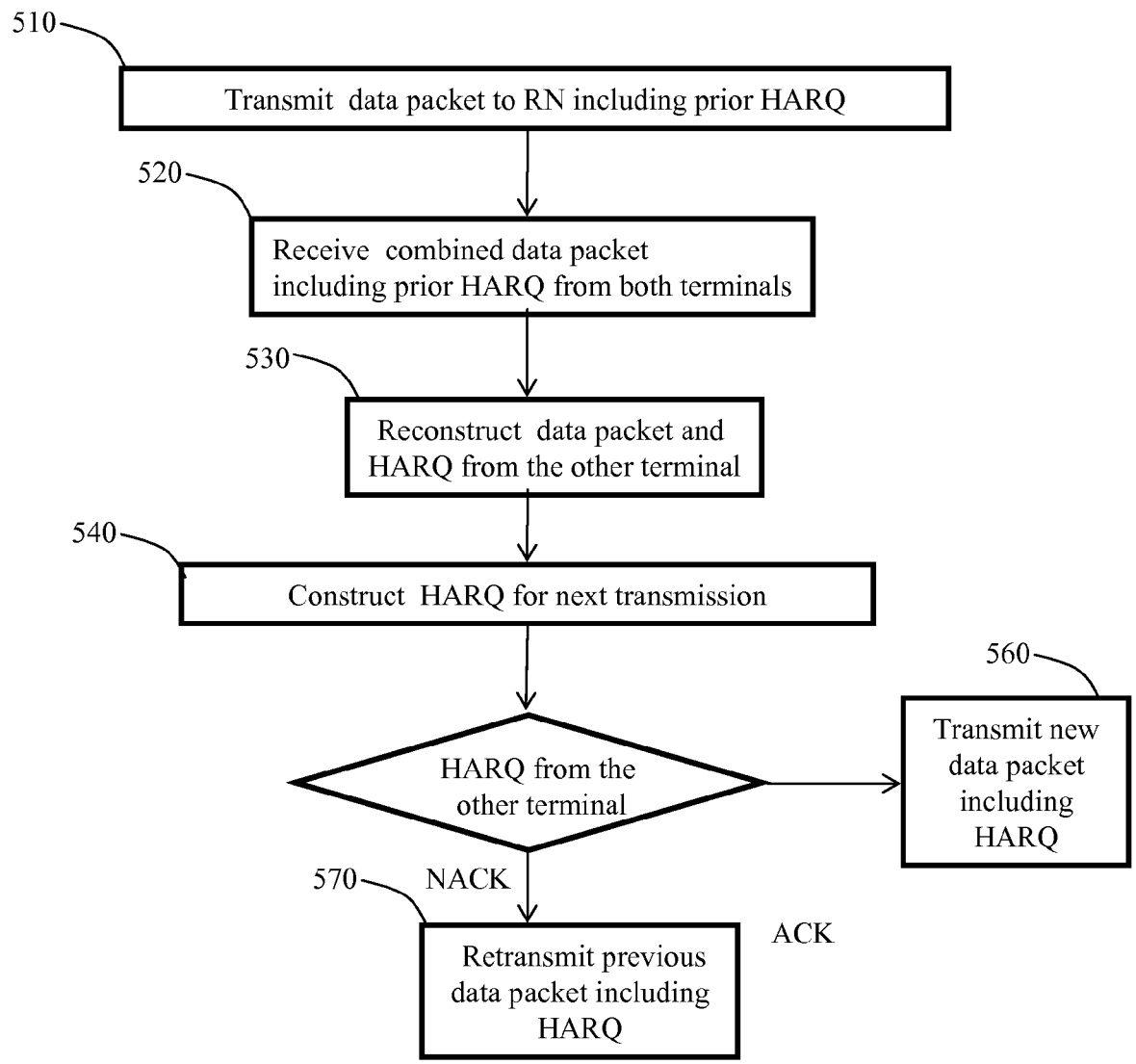

FIG. 5, which includes FIGS. 5*a* and 5*b*, illustrates operations at a relay node and at a UE or an eNB in accordance with embodiments of the invention.

The HARQ signal generation at the RN is first described in accordance with an embodiment of the invention. At subframe 2, the RN receives and decodes a data packet (along with HARQ relating to decoding at subframe 9) from the UE (box 410 in FIG. 5*a*). The RN constructs a corresponding HARQ indicating the success/failure (box 420 in FIG. 5*a*) of the transmission at subframe 2. At subframe 3, the RN receives and decodes a data packet (along with HARQ relating to decoding at subframe 9) from the eNB. As indicated in box 440 of FIG. 5*a*, the RN constructs a corresponding HARQ indicating the success/failure of the transmission at subframe 3.

Therefore, the RN constructs two indicators (ACK/NACK) corresponding to the success or failure of the decoding of the packets from the UE and eNB (for example, from subframes 2 and 3 in FIG. 3*a*). In other words, the RN first constructs a first HARQ indicator for the packets received from the UE in subframe 2. The RN then constructs a second HARQ indicator for the packet received from the eNB in subframe 3.

The RN then ORs (or ANDs in some embodiments) the binary ACK/NACK signals (first and second HARQ indicators) to construct a single HARQ signal (see also FIG. 3*d*). In order to generate each of these HARQs, the RN first decodes the packets from subframes 2 and 3. If either packet is decoded incorrectly (either eNB or UE results in a NACK at RN), then the RN transmits a NACK at subframe 9 (box 480 in FIG. 5*a*). This triggers retransmission from both the eNB and the UE. This retransmission occurs until the data has been correctly decoded for both UL and DL at the RN. If both the packets from the UL and DL are decoded correctly at the RN, the RN XORs the entire data (including the HARQs relating to decoding at previous 9) (box 460 in FIG. 5*a*).

At subframe 9, the RN broadcasts the single HARQ signal along with the combined data from the UE and eNB (for example, in subframe 9) (box 470 in FIG. 5*a*). For instance, in FIG. 3*a*, the HARQ at subframe 9 is an indication of whether the signals at subframes 2 and 3 were decoded correctly or not, and the HARQ at subframe 4 similarly relates to the prior transmissions from subframes 7 and 8. Thus, network coding at subframes 4 and 9 is only conducted when prior eNB and UE transmissions are correctly decoded at the RN, which can readily be verified using the CRC codes. This is verified with a simple OR of the ACK/NACK from subframes 2 and 3.

The HARQ indicators corresponding to prior relay transmissions are transmitted from eNB and UE in their corresponding subframes. For instance, the HARQ relating to the relay transmission in subframe 4 (not shown in the diagram of FIG. 3*a*) are transmitted to the RN in subframes 7 and 8 of the current frame (box 510 in FIG. 5*b*). The RN treats the HARQ as data and XORs the received ACK/NACK to construct a single network coded HARQ indicator (box 470 in FIG. 5*a*). The RN transmits the single network coded HARQ indicator along with a combined single data packet (box 480 in FIG. 5*a*).

At subframe 9, the eNB uses knowledge regarding its own signal (both data and HARQ) to remove self-interference via XORing, and then decodes the data packet from the UE (box 530 in FIG. 5*b*). The UE performs a similar operation. The eNB and UE will also use an XOR operation to remove their respective self-interference indicators and to reveal the corresponding HARQ indicator from the other terminal (box 530 in FIG. 5*b*). This signal will be used to indicate whether re-transmission is necessary from each terminal. If no re-transmission is necessary, a new data packet is transmitted at the next subframe (box 560 in FIG. 5*b*). If re-transmission is necessary, the previously transmitted data packet is transmitted at the next subframe (box 570 in FIG. 5*b*).

The UE and eNB construct HARQ relating to the success/failure of the previous step, which they transmit at subframe 2 and subframe 3, respectively (box 540 in FIG. 5*b*). This cycle repeats from the beginning (and similarly for subframes 7, 8 and 4).

A block diagram of an embodiment relay node 600 is shown in FIG. 6. Relay node 600 has donor antenna 620, which transmits to and from the eNB and is coupled to coupler 618, transmitter 622 and receiver 616. Service antenna 612, which transmits to and receives signals from user devices, is coupled to coupler 610, transmitter 606 and receiver 608. RN processor 614, which is coupled to both the donor and service signal paths, controls the operation of relay node and implements embodiment algorithms described herein. In one or more embodiments, the embodiments of the invention including XOR and OR gates may be implemented within the transmitter 606, the receiver 608, or as a separate circuitry. Some of the algorithms, such as to implement the operations illustrated in FIGS. 4*a* and 5*a*, may also be implemented as software executed using the RN processor 614. In an embodiment of the present invention, relay node 600 is configured to operate in a LTE network using an OFDMA uplink downlink channels divided into multiple subbands. In alternative embodiments, other systems, network types and transmission schemes can be used.

A block diagram of embodiment user device 700 is illustrated in FIG. 7. User device 700 can be, for example, a cellular telephone or other mobile communication device, such as a computer or network enabled peripheral. Alternatively, user device 700 can be a non-mobile device, such as a desktop computer with wireless network connectivity. User device 700 has mobile processor 704, transmitter (TX) 706 and receiver 708, which are coupled to antenna 712 via coupler 710. In one or more embodiments, the embodiments of the invention including XOR gates may be implemented within the transmitter 706, the receiver 708, or as a separate circuitry. Some of the algorithms, such as to implement the operations illustrated in FIGS. 4*b* and 5*b*, may also be implemented as software executed using the mobile processor 704. User interface 702 is coupled to mobile processor 704 and provides interfaces to input device 714, speaker 716, and display 718, for example. Alternatively, user device 700 may have a different configuration with respect to user interface 702, or user interface 702 may be omitted entirely. The user device 700 may have multiple transmitters, receivers and antennas to support MIMO operation.

A block diagram of an embodiment eNB 800 is illustrated in FIG. 8. eNB 800 has eNB processor 804 coupled to transmitter (TX) 806 and receiver 808, and network interface 802. Transmitter 806 and receiver 808 are coupled to antenna 812 via coupler 810. The eNB processor 804 executes embodiment methods and algorithms as described above. In one or more embodiments, the embodiments of the invention including XOR gates may be implemented within the transmitter 806, the receiver 808, or as a separate circuitry. Some of the algorithms, such as to implement the operations illustrated in FIGS. 4b and 5b, may also be implemented as software executed using the eNB processor 804. In an embodiment, eNB 800 is configured to operate in a LTE network using an OFDMA downlink and uplink channels. In alternative embodiments, other systems, network types and transmission schemes can be used, for example, 1XEV-DO, IEEE 802.11, IEEE 802.15 and IEEE 802.16. The eNB 800 may have multiple transmitters, receivers and antennas to support MIMO operation.

Embodiments of the invention advantageously reduce total channel resources spent in uplink-downlink transmission from 4 to 3. The embodiments of the invention while shown for configuration #2 can be applied and/or extended to other TDD configurations for LTE. Advantageously, no change to the UE frame structure is required, while requiring only a minimal change to the eNB frame structure.

In various embodiments, the HARQ signals from the RN (decode-and-forward only) are transmitted along with data packets via the puncturing (nulling) of appropriate data resource locations.

In various embodiments, hardware changes (compared to conventional relay-based LTE systems) include additional XOR gates for removal of self-interference at the UE and eNB, and XOR and OR gates at the RN for HARQ construction. These gates may be implemented within existing hardware such as within the transmitter and receiver circuitry either as part of existing chips or as additional chips. In various embodiments, the circuitry for the XOR and/or OR gates may be implemented as part of a general purpose circuitry or a special purpose circuitry.

Embodiments of the invention provide a feasible frame structure for network coding within a single LTE-TDD radio frame. In various embodiments, a Hybrid ARQ re-transmission protocol is designed to support both amplify-and-forward and decode-and-forward (analog and digital) network coding schemes with simple XOR and/or OR operations. In various embodiments, the HARQ re-transmission protocol method includes ORing of ACK/NACKs from decoding the terminals' signals at the relay, and XORing for ACK/NACKs generated by terminals in response to the relay signals.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of wireless communication comprising:
at a user equipment, transmitting a first data packet during a first subframe of a radio frame;
receiving a single data packet in a third subframe of the radio frame, the single data packet comprising the first data packet and a second data packet transmitted from one of a base station and a relay node during a second subframe, the second data packet comprising a first HARQ signal from the base station for a previously transmitted data packet; and
retransmitting the previously transmitted data packet during a fourth subframe of the radio frame based on the first HARQ signal.

2. The method of claim 1, wherein the single data packet comprises a analog super-positioning of the first and the second data packets.

3. The method of claim 2, wherein transmitting a first data packet comprises transmitting a second HARQ signal.

4. The method of claim 3, wherein the single data packet comprises the first and the second HARQ signals.

5. A method of wireless communication comprising:
receiving a first data packet at a relay node, the first data packet being transmitted from a user equipment during a first subframe of a radio frame;
receiving a second data packet at the relay node, the second data packet being transmitted from a base station during a second subframe of the radio frame;
at the relay node, constructing a user equipment HARQ indicator indicating a success or failure of receiving the first data packet at the relay node and a base station HARQ indicator indicating a success or failure of receiving the second data packet at the relay node;
from the relay node, transmitting a single HARQ signal based on the user equipment HARQ indicator and the base station HARQ indicator; and
from the relay node, transmitting a single data packet in a third subframe of the radio frame, the single data packet comprising the first and the second data packets.

6. The method of claim 5, wherein the first data packet comprises a first HARQ signal relating to success or failure of a previous transmission from the base station.

7. The method of claim 6, wherein the base station constructs the success or failure of the previous transmission from the base station using the first HARQ signal in the single data packet.

8. The method of claim 6, wherein the second data packet comprises a second HARQ signal relating to success or failure of a previous transmission.

9. The method of claim 8, wherein the user equipment constructs the success or failure of the previous transmission from the user equipment using the second HARQ signal in the single data packet.

10. The method of claim 5, further comprising:
receiving again the first data packet and the second data packet if the single HARQ signal indicates a failure at receiving the first data packet at the relay node or the second data packet at the relay node.

11. The method of claim 10, wherein the relay node transmits the single data packet if the single HARQ signal indicates a success at receiving the first data packet at the relay node and the second data packet at the relay node.

12. The method of claim 5, wherein the relay node constructs the single data packet using analog network coding, wherein the relay node constructs the single data packet by super-positioning an analog version of the first and the second data packets received at the relay node.

13. The method of claim 8, wherein transmitting a single data packet comprises forwarding the first and the second HARQ signals received at the relay node.

14. The method of claim 13, further comprising, at the relay node, receiving a previously transmitted data packet from the user equipment based on the first HARQ signal.

15. The method of claim 13, further comprising, at the relay node, receiving a previously transmitted data packet from the base station based on the second HARQ signal.

16. The method of claim 5, wherein the relay node constructs the single data packet using digital network coding.

17. The method of claim 16, wherein the relay node constructs the single data packet by independently demodulating, decoding and XORing the first and the second data packets as received at the relay node.

18. The method of claim 16, further comprising:
  receiving a first HARQ indicator from the user equipment along with the first data packet; and
  receiving a second HARQ indicator from the base station along with the second data packet.

19. The method of claim 18, further comprising forwarding the first and the second HARQ indicator while transmitting the single data packet.

20. A method of wireless communication comprising:
  transmitting a first data packet from a base station during a first subframe of a radio frame, wherein a second subframe of the radio frame is allocated to a user device for transmission of a second data packet;
  at the base station, receiving a single data packet in a third subframe of the radio frame, the single data packet comprises the first data packet and the second data packet from the user device;
  extracting the second data packet, the second data packet comprising a HARQ indicator from the user device;
  from the base station, transmitting a next data packet if the HARQ indicator from the user device indicates a success of a previous transmission from the base station; and
  from the base station, transmitting a previously transmitted data packet if the HARQ indicator from the user device indicates a failure of the previous transmission from the base station.

21. The method of claim 20, further comprising constructing the single data packet using analog network coding.

22. The method of claim 20, further comprising constructing the single data packet using digital network coding.

23. A network component comprising:
  a receiver configured to receive a first data packet and a second data packet, the first data packet being transmitted from a user equipment during a first subframe of a radio frame, the second data packet being transmitted from a base station during a second subframe of the radio frame;
  a transmitter configured to transmit a single data packet in a third subframe of the radio frame, the single data packet comprising the first and the second data packets; and
  a feedback provider configured to construct a single HARQ signal indicating a success or failure of receiving the first data packet and the second data packet, wherein the transmitter is further configured to transmit the single HARQ signal.

24. The network component of claim 23, wherein the first data packet comprises a first HARQ signal relating to success or failure of a previous transmission.

25. The network component of claim 23, wherein the second data packet comprises a second HARQ signal relating to success or failure of a previous transmission.

26. The network component of claim 23, wherein the network component is configured to encode the single data packet using digital network coding.

27. The network component of claim 23, wherein the single HARQ signal indicates a failure if there is a failure in receiving either the first data packet or the second data packet, and wherein the single HARQ signal indicates a success if there is a success in receiving both the first data packet and the second data packet.

* * * * *